(12) United States Patent
Natori

(10) Patent No.: US 8,924,104 B2
(45) Date of Patent: Dec. 30, 2014

(54) SHIFT CONTROL APPARATUS FOR CONTINUOUSLY VARIABLE TRANSMISSION

(71) Applicant: Akio Natori, Nagoya (JP)

(72) Inventor: Akio Natori, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/102,985

(22) Filed: Dec. 11, 2013

(65) Prior Publication Data

US 2014/0162815 A1  Jun. 12, 2014

(30) Foreign Application Priority Data

Dec. 12, 2012  (JP) ................................. 2012-271580

(51) Int. Cl.
*F16H 61/02* (2006.01)
*F16H 61/662* (2006.01)
*F16H 61/66* (2006.01)

(52) U.S. Cl.
CPC .. *F16H 61/66272* (2013.01); *F16H 2061/6605* (2013.01); *F16H 61/66259* (2013.01)
USPC ............................................. 701/51; 701/61

(58) Field of Classification Search
USPC .................................. 701/51, 61; 474/11, 70
See application file for complete search history.

(56) References Cited

U.S. PATENT DOCUMENTS

| | | | |
|---|---|---|---|
| 7,806,790 B2* | 10/2010 | Iwatsuki et al. | ................ 474/12 |
| 8,478,483 B2* | 7/2013 | Takemori et al. | ............... 701/36 |
| 2005/0080536 A1* | 4/2005 | Yamaguchi et al. | ........... 701/51 |
| 2007/0203631 A1* | 8/2007 | Shimazu et al. | ................ 701/51 |
| 2012/0022750 A1* | 1/2012 | Matsuda | ........................ 701/51 |

FOREIGN PATENT DOCUMENTS

| | | |
|---|---|---|
| JP | 0392664 A | 4/1991 |
| JP | 07119803 A | 5/1995 |
| JP | 2005-315291 A | 11/2005 |
| JP | 2006-038212 A | 2/2006 |
| JP | 2006-097757 A | 4/2006 |
| JP | 2007-232147 A | 9/2007 |
| JP | 2010-242935 A | 10/2010 |

* cited by examiner

*Primary Examiner* — Edwin A Young
(74) *Attorney, Agent, or Firm* — Kenyon & Kenyon LLP

(57) ABSTRACT

Disclosed is a shift control apparatus for a continuously variable transmission configured to transmit power from a drive power source of a vehicle to a drive wheel of the vehicle. The shift control apparatus is configured to change a gear ratio of the continuously variable transmission with changes in vehicle speed and, during sudden braking of the vehicle, change a rate of change of the gear ratio (a shift speed) of the continuously variable transmission in a downshift direction depending upon a wheel slip ratio calculated from a wheel speed and the vehicle speed.

7 Claims, 9 Drawing Sheets

SHIFT CONTROL APPARATUS FOR CONTINUOUSLY VARIABLE TRANSMISSION

CROSS-REFERENCE TO RELATED APPLICATION

This application claims priority under 35 USC 119(a) to Patent Application No. 2012-271580 filed in Japan on Dec. 12, 2012, the entire contents of which are incorporated herein by reference.

BACKGROUND

1. Technical Field

The present invention relates to a shift control apparatus for a continuously variable transmission installed in a vehicle. Particularly, the present invention relates to improvement in shift control during sudden braking of the vehicle.

2. Related Art

In a known belt CVT (continuously variable transmission) as disclosed in, for example, JP-A No. 2006-97757 or JP-A No. 2010-242935, a gear shift is made by increasing or reducing the individual widths of pulley grooves of a pair of pulleys around which a belt is winded.

Specifically, while the belt is clamped by two pairs of sheaves, each pair constituting one pulley, in order to apply tension to the belt, the clamped state of the belt is changed by the sheaves constituting at least one or both of the pair of pulleys in order to make a gear shift. For example, a hydraulic actuator for the secondary pulley at the output side of the CVT is supplied with a hydraulic pressure meeting a required torque, such as typified by an engine load, to ensure a necessary amount of transmission torque (control of belt clamping force). On the other hand, a hydraulic actuator for the primary pulley at the input side of the CVT is supplied with a hydraulic pressure for a gear shift to change the winding position of the belt (control of gear ratio).

During sudden braking of a vehicle equipped with a conventional belt CVT, for the purpose of ensuring the re-accelerability or startability later on, the hydraulic pressure of the hydraulic actuator for the primary pulley, regarding the control of gear ratio, is controlled to increase the gear ratio (change it toward $\gamma max$). Concurrently, as regards the control of belt clamping force, the hydraulic pressure of the hydraulic actuator for the secondary pulley is controlled to increase the belt clamping force. In this case, the hydraulic pressure to be supplied to the hydraulic actuator for the secondary pulley is fixedly set to increase the shift speed of a gear shift toward $\gamma max$. In other words, in order to early achieve a gear ratio reflecting a change in vehicle speed due to sudden braking (increase the belt returnability), the hydraulic pressure to be supplied to the hydraulic actuator for the secondary pulley is set a predetermined amount higher than before.

However, if during sudden braking the hydraulic pressure to be supplied to the hydraulic actuator for the secondary pulley is simply set a fixed amount higher than before, this simple measure has no way to optimize the hydraulic pressure. The reason for this is that the optimum value of the belt clamping force varies depending upon the condition of a road surface on which the vehicle is traveling. Therefore, the conventional control of belt clamping force does not have the capability to optimize the belt clamping force according to the road surface condition.

Specifically, if the aforementioned belt clamping force (set a fixed amount higher than before) is short of the optimum value, sufficient belt returnability may not be able to be obtained. On the other hand, if the hydraulic pressure is higher than the optimum value, the power of an oil pump for providing the hydraulic pressure is increased more than necessary, which will reduce the energy efficiency. More specifically, for example, in a CVT in which the hydraulic pressure discharged from an oil pump operable by the power of an engine (internal combustion engine) is used, the fuel economy will be reduced.

JP-A No. 2006-97757 discloses a technique in which the shift speed is changed depending upon the gear ratio or the deceleration of the vehicle. However, this technique cannot provide an optimum shift speed appropriate to the road surface condition.

SUMMARY

An object of the present invention is to provide a shift control apparatus for a continuously variable transmission which can achieve a suitable shift control when a vehicle is suddenly braked.

The present invention relates to a shift control apparatus for a continuously variable transmission configured to transmit power from a drive power source of a vehicle toward a drive wheel of the vehicle. In an aspect of the present invention, the shift control apparatus is configured to change a gear ratio of the continuously variable transmission with changes in vehicle speed and, during sudden braking of the vehicle, change a rate of change of the gear ratio (hereinafter referred to as a shift speed) of the continuously variable transmission in a downshift direction depending upon a wheel slip ratio calculated from a wheel speed and the vehicle speed.

With this feature, during sudden braking of the vehicle, the wheel slip ratio is obtained as a value reflecting the road surface condition and the shift speed of the continuously variable transmission in the downshift direction is changed depending upon the obtained wheel slip ratio. Thus, the shift control appropriate to the road surface condition can be executed with high accuracy. Furthermore, the wheel slip ratio is a value reflecting the road surface condition, the state of sudden braking (the magnitude of a braking force), and the locked state of the wheel. Therefore, the shift speed in the downshift direction depending upon these factors can be obtained, which enables early achievement to a gear ratio capable of ensuring good re-accelerability and startability of the vehicle.

By way of an example, the shift speed of the continuously variable transmission in the downshift direction may be set higher, the higher is the wheel slip ratio.

By way of another example, if at least one of a plurality of wheels of the vehicle has a wheel slip ratio of a predetermined threshold value or higher, the shift speed of the continuously variable transmission in the downshift direction may be set higher, the higher is the wheel slip ratio of the at least one wheel.

When the wheel slip ratio is high, the actual wheel speed is lower than the wheel speed corresponding to the vehicle speed. Under this situation, it is desired that the gear ratio of the continuously variable transmission be set larger than the gear ratio meeting the wheel speed corresponding to the vehicle speed to ensure the re-accelerability and startability of the vehicle. Therefore, when the wheel slip ratio is high, i.e., when the wheel speed is lower than the vehicle speed, the shift speed of the continuously variable transmission in the downshift direction is set high to early increase the gear ratio. Thus, the gear ratio depending upon the wheel slip ratio, i.e., the gear ratio appropriate to the road surface condition, can be early ensured.

A belt continuously variable transmission may be employed as the continuously variable transmission. Specifically, for example, the continuously variable transmission is formed of a belt continuously variable transmission which includes: a primary pulley configured to receive the power from the drive power source; a secondary pulley configured to output the power toward the drive wheel; a belt winded around the primary pulley and the secondary pulley; a primary side hydraulic actuator configured to move a sheave of the primary pulley to change a width of a pulley groove thereof; and a secondary side hydraulic actuator configured to move a sheave of the secondary pulley to change a width of a pulley groove thereof and is configured so that when the widths of the pulley grooves are changed, respective winding positions of the belt in radial directions of the primary and secondary pulleys are allowed to be accordingly changed to change the gear ratio.

In this case, the shift control apparatus may set the hydraulic pressure to be supplied to the secondary side hydraulic actuator higher, the higher is the wheel slip ratio, thus increasing a belt clamping force of the secondary pulley.

If in this manner the hydraulic pressure to be supplied to the secondary side hydraulic actuator is set high when the wheel slip ratio is high, the width of the V-groove of the secondary pulley is rapidly increased. This is accompanied by an increase of the pressure applied from the belt to the sheave of the primary pulley to promote the discharge of working fluid from the primary side hydraulic actuator. Thus, the width of the V-groove of the primary pulley is rapidly increased. As a result, the gear ratio of the belt continuously variable transmission is rapidly increased, which enables early achievement of a gear ratio appropriate to the road surface condition.

Besides the wheel slip ratio, the vehicle speed and the gear ratio of the continuously variable transmission may be employed as parameters for changing the shift speed of the continuously variable transmission in the downshift direction. In this case, it is preferred that the shift speed of the continuously variable transmission in the downshift direction be set higher, the higher is the vehicle speed and/or the smaller is the gear ratio of the continuously variable transmission. Thus, the control of the shift speed of the continuously variable transmission in the downshift direction can be executed with higher accuracy.

Alternatively, under a situation where the wheel slip ratio cannot be acquired, a deceleration of the vehicle and the vehicle speed may be employed as parameters for changing the shift speed of the continuously variable transmission in the downshift direction. In this case, it is preferred that the shift speed of the continuously variable transmission in the downshift direction be set higher, the higher is the deceleration of the vehicle and/or the higher is the vehicle speed.

An example of the situation where the wheel slip ratio cannot be acquired is the case where the wheel speed cannot be acquired. Even under, as in this case, the situation where the wheel slip ratio cannot be acquired, if the shift speed of the continuously variable transmission in the downshift direction can be changed based on the deceleration of the vehicle and the vehicle speed, the gear ratio appropriate to the road surface condition can be early ensured as compared with the conventional technique in which the shift speed is fixedly set.

DETAILED DESCRIPTION

Hereinafter, a description will be given of an embodiment of the present invention with reference to the drawings. In this embodiment, a description will be given of the case where the present invention is applied to a vehicle equipped with a belt CVT (continuously variable transmission).

Figure 1:
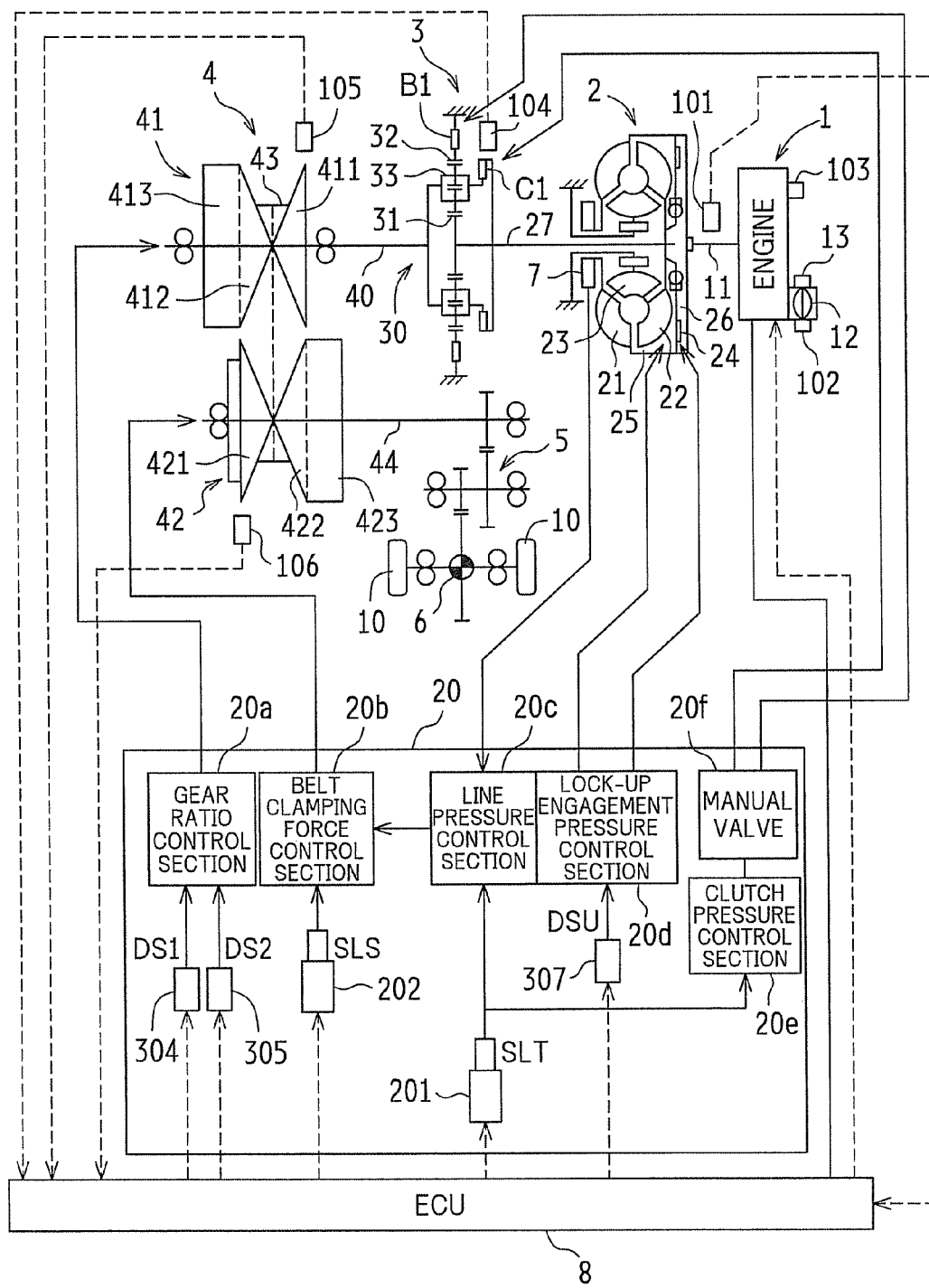
FIG. 1 is a schematic configuration diagram showing a power train of a vehicle equipped with a belt CVT according to an embodiment.

FIG. 1 is a schematic configuration diagram showing an example of the belt CVT-equipped vehicle according to this embodiment. The vehicle according to this embodiment is an FF (front engine-front drive) vehicle. The vehicle is equipped with an engine (internal combustion engine) 1 as the drive power source, a torque converter 2 as a fluid drive mechanism, a forward/reverse switching mechanism 3, a belt CVT 4, a reduction gear mechanism 5, a differential gear mechanism 6, an ECU (electronic control unit) 8, and so on.

Furthermore, a shift control apparatus for a CVT according to the present invention is implemented by a combination of the ECU 8, the belt CVT 4, a hydraulic control circuit 20, and so on all of which will be described later.

A crankshaft 11 serving as an output shaft of the engine 1 is coupled to the torque converter 2. The output of the engine 1 is transmitted from the torque converter 2 through the forward/reverse switching mechanism 3, the belt CVT 4, and the reduction gear mechanism 5 to the differential gear mechanism 6 and then distributed to right and left drive wheels 10, 10.

The following description is given of the details of the engine 1, the torque converter 2, the forward/reverse switching mechanism 3, the belt CVT 4, and the ECU 8.

—Engine—

The engine 1 is, for example, a multi-cylinder gasoline engine. The volume of air to be taken in the engine 1 (intake air volume) is controlled by an electronically controlled throttle valve 12. The throttle valve 12 can electronically control the throttle opening independent of the driver's actuation of the accelerator pedal. The opening of the throttle valve 12 (throttle opening) can be detected by a throttle position sensor 102. The temperature of cooling water for the engine 1 can be detected by a water temperature sensor 103.

The throttle opening of the throttle valve 12 can be controlled by the ECU 8. Specifically, the throttle opening is controlled to give an optimal intake air volume (target intake air volume) appropriate to the engine revolution speed Ne detected by an engine speed sensor 101, the amount of depression of the accelerator pedal (amount of actuation of the accelerator pedal; Acc) by the driver, and so on. More specifically, the actual throttle opening of the throttle valve 12 is detected using the throttle position sensor 102. A throttle motor 13 for the throttle valve 12 is feedback-controlled so that the actual throttle opening agrees with the throttle opening capable of achieving the target intake air volume (target throttle opening).

—Torque Converter—

The torque converter 2 includes a pump impeller 21 at the input side, a turbine runner 22 at the output side, a stator 23 having the function of amplifying torque, and so on. The torque converter 2 performs power transmission via a fluid between the pump impeller 21 and the turbine runner 22. The pump impeller 21 is coupled to the crankshaft 11 of the engine 1. The turbine runner 22 is coupled through a turbine shaft 27 to the forward/reverse switching mechanism 3.

The torque converter 2 is provided with a lock-up clutch 24 capable of directly coupling the input side and output side of the torque converter 2. The lock-up clutch 24 can be fully engaged, partly engaged (engaged in slipping conditions), or released by controlling the differential pressure (lock-up differential pressure) between the hydraulic pressure in an engaging chamber 25 of the lock-up clutch 24 and the hydraulic pressure in a releasing chamber 26 thereof.

When the lock-up clutch 24 is fully engaged, the pump impeller 21 and the turbine runner 22 rotate together. When the lock-up clutch 24 is engaged in a predetermined slipping condition (partly engaged position), the turbine runner 22 rotates while following, but with a predetermined amount of slip on, the pump impeller 21. On the other hand, when the lock-up differential pressure is set at a negative value, the lock-up clutch 24 is released.

Furthermore, the torque converter 2 is also provided with a mechanical oil pump (hydraulic pressure source) 7 which is connected to and can be driven by the pump impeller 21.

—Forward/Reverse Switching Mechanism—

The forward/reverse switching mechanism 3 includes a double-pinion planetary gear set 30, a forward clutch C1, and a reverse brake B1.

A sun gear 31 of the planetary gear set 30 is integrally connected to the turbine shaft 27 of the torque converter 2. A carrier 33 of the planetary gear set 30 is integrally connected to an input shaft 40 of the belt CVT 4. The carrier 33 and the sun gear 31 can be connected together by the forward clutch C1. A ring gear 32 of the planetary gear set 30 can be fixed through the reverse brake B1 to a housing of the forward/reverse switching mechanism 3.

The forward clutch C1 and the reverse brake B1 are hydraulic friction engagement elements capable of being engaged and released by a hydraulic control circuit 20 to be described later. When the forward clutch C1 is engaged and the reverse brake B1 is released, the forward/reverse switching mechanism 3 rotates in its entirety to establish a forward power transmission path. In this state, a forward driving force is transmitted toward the belt CVT 4.

On the other hand, when the reverse brake B1 is engaged and the forward clutch C1 is released, the forward/reverse switching mechanism 3 establishes a reverse power transmission path. In this state, the input shaft 40 rotates reversely to the turbine shaft 27 and a reverse driving force thus produced is transmitted toward the belt CVT 4.

When both the forward clutch C1 and the reverse brake B1 are released, the forward/reverse switching mechanism 3 is moved into a neutral position (an interrupted position) in which power transmission is interrupted.

—Belt CVT—

The belt CVT 4 receives power from the engine 1, changes the revolution speed of the input shaft 40, and then transmits the power toward the drive wheels 10, 10. The belt CVT 4 includes a primary pulley 41 at the input side, a secondary pulley 42 at the output side, and a belt 43 made of metal and mounted around the primary pulley 41 and the secondary pulley 42.

The primary pulley 41 is a variable pulley capable of varying its effective diameter. The primary pulley 41 is composed of a fixed sheave 411 fixed to the input shaft 40 and a movable sheave 412 disposed on the input shaft 40 in a manner capable of slide movement thereon only in an axial direction of the input shaft 40. The secondary pulley 42 is also a variable pulley capable of varying its effective diameter. The secondary pulley 42 is composed of a fixed sheave 421 fixed to an output shaft 44 of the CVT 4 and a movable sheave 422 disposed on the output shaft 44 in a manner capable of slide movement thereon only in an axial direction of the output shaft 44.

A hydraulic actuator 413 is disposed next to the movable sheave 412 of the primary pulley 41. The hydraulic actuator 413 serves to change the width of a V-groove formed between the fixed sheave 411 and the movable sheave 412. On the other hand, a hydraulic actuator 423 is disposed next to the movable sheave 422 of the secondary pulley 42. The hydraulic actuator 423 serves to change the width of a V-groove formed between the fixed sheave 421 and the movable sheave 422.

In the belt CVT 4 having the above structure, by the control of the hydraulic pressure of the hydraulic actuator 413 for the primary pulley 41, the widths of the V-grooves of the primary pulley 41 and the secondary pulley 42 are changed to change the winding diameter (effective diameter) of the belt 43. Thus, the gear ratio $\gamma$ ($\gamma$=(primary pulley revolution speed (input shaft revolution speed) Nin)/(secondary pulley revolution speed (output shaft revolution speed) Nout)) continuously changes. Furthermore, the hydraulic pressure of the hydraulic actuator 423 for the secondary pulley 42 (hereinafter also referred to as the secondary hydraulic pressure) is controlled so that the belt 43 can be clamped with a predetermined clamping force that will not cause belt slip. These hydraulic pressure controls are effected by the ECU 8 and the hydraulic control circuit 20.

—Hydraulic Control Circuit—

The hydraulic control circuit 20 is constituted by a gear ratio control section 20a, a belt clamping force control section 20b, a line pressure control section 20c, a lock-up engagement pressure control section 20d, a clutch pressure control section 20e, a manual valve 20f, and so on.

The ECU 8 is configured to send control signals to solenoids constituting part of the hydraulic control circuit 20, i.e., a shift control solenoid (DS1) 304 and a shift control solenoid (DS2) 305 both for gear ratio control; a linear solenoid (SLS) 202 for belt clamping force control; a linear solenoid (SLT) 201 for line pressure control; and a duty solenoid (DSU) 307 for lock-up engagement pressure control.

Figure 2:
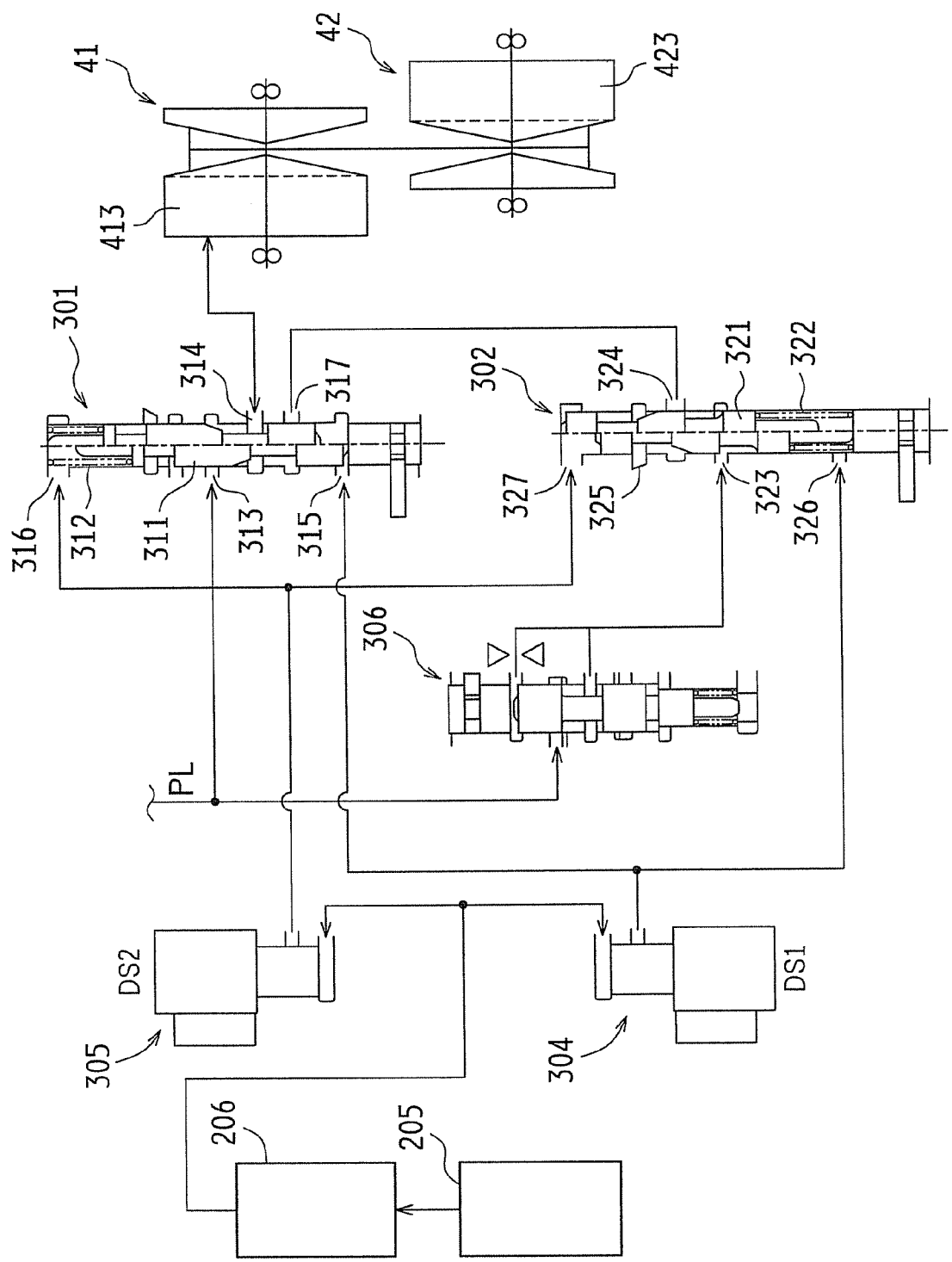
FIG. 2 is a configuration diagram of a portion of a hydraulic control circuit in which a hydraulic actuator for a primary pulley is controlled.
Figure 3:
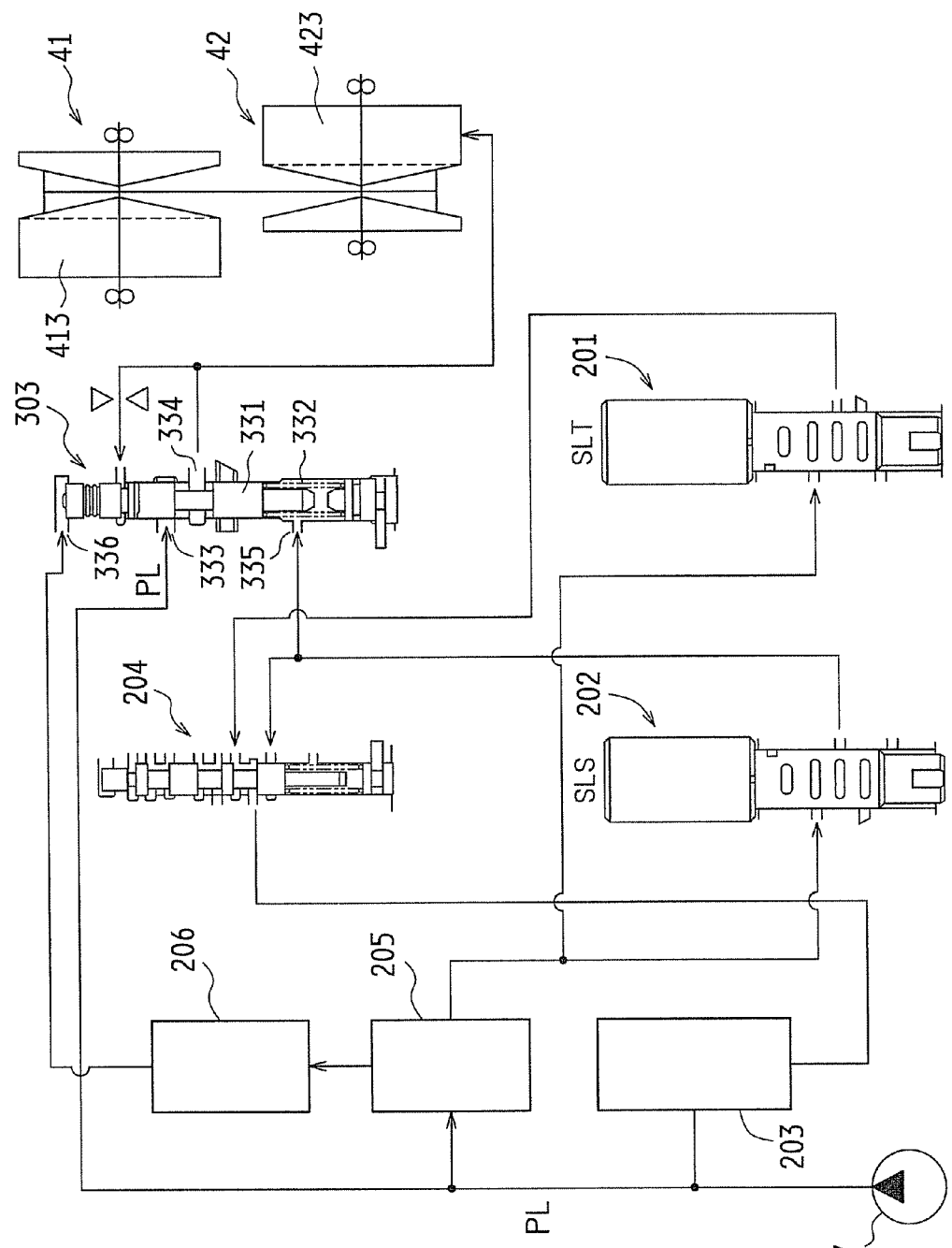
FIG. 3 is a configuration diagram of a portion of the hydraulic control circuit in which the belt clamping force is controlled.

With reference to FIGS. 2 and 3, a description will be given below of a hydraulic control circuit portion of the hydraulic control circuit 20 for the hydraulic actuator 413 for the primary pulley 41 (a specific hydraulic circuit configuration of the gear ratio control section 20a) and a hydraulic control circuit portion of the hydraulic control circuit 20 for the hydraulic actuator 423 for the secondary pulley 42 (a specific hydraulic circuit configuration of the belt clamping force control section 20b). The hydraulic control circuit shown in FIGS. 2 and 3 is merely illustrative. The hydraulic control circuit applicable to the present invention is not limited to that shown in the figures and includes various forms.

Referring first to FIG. 3, the hydraulic pressure generated by the oil pump 7 is adjusted by a primary regulator valve 203 to produce a line pressure PL. A control hydraulic pressure output from the linear solenoid (SLT) 201 is provided through a clutch apply control valve 204 to the primary regulator valve 203. The primary regulator valve 203 is actuated by the control hydraulic pressure serving as a pilot pressure.

Alternatively, a control hydraulic pressure from the linear solenoid (SLS) 202 may be provided to the primary regulator valve 203 by switching the flow path of the clutch apply control valve 204, so that the control hydraulic pressure may act as a pilot pressure for the primary regulator valve 203 to produce the line pressure PL. A hydraulic pressure modulated from the line pressure PL by a modulator valve 205 is provided to the linear solenoid (SLT) 201 and the linear solenoid (SLS) 202.

The linear solenoid (SLT) 201 outputs the control hydraulic pressure according to the electric current value depending upon a duty signal output from the ECU 8. The linear solenoid (SLT) 201 is a normally open solenoid valve.

The linear solenoid (SLS) 202 outputs the control hydraulic pressure according to the electric current value depending upon a duty signal output from the ECU 8. The linear solenoid (SLS) 202 is also a normally open solenoid valve.

In the hydraulic control circuit shown in FIGS. 2 and 3, a modulator valve 206 modulates the hydraulic pressure output from the modulator valve 205 to a certain pressure and provides the modulated pressure to a shift control solenoid (DS1) 304, a shift control solenoid (DS2) 305, and a belt clamping force control valve 303, all of which will be described later.

<Circuit Configuration for Shift Control>

Next, a description will be given of the hydraulic control circuit portion for the hydraulic actuator 413 for the primary pulley 41. As shown in FIG. 2, the hydraulic actuator 413 for the primary pulley 41 is connected to an upshift control valve 301.

The upshift control valve 301 is provided with an axially movable spool 311. A spring 312 is disposed in one end portion of the upshift control valve 301 near to one end of the spool 311 (the upper end thereof in FIG. 2). A first hydraulic port 315 is formed in the other end portion of the upshift control valve 301 opposite to the spring 312 with the spool 311 in between. Furthermore, a second hydraulic port 316 is formed in the one end portion of the upshift control valve 301 in which the spring 312 is disposed.

The first hydraulic port 315 is connected to the shift control solenoid (DS1) 304 configured to output the control hydraulic pressure according to the electric current value depending upon a duty signal (DS1 shift duty (upshift duty)) output from the ECU 8. The control hydraulic pressure output from the shift control solenoid (DS1) 304 is applied to the first hydraulic port 315. The second hydraulic port 316 is connected to the shift control solenoid (DS2) 305 configured to output the control hydraulic pressure according to the electric current value depending upon a duty signal (DS2 shift duty (downshift duty)) output from the ECU 8. The control hydraulic pressure output from the shift control solenoid (DS2) 305 is applied to the second hydraulic port 316.

Furthermore, the upshift control valve 301 has an input port 313 through which the line pressure PL is provided, an input/output port 314 connected to (communicated with) the hydraulic actuator 413 for the primary pulley 41, and an output port 317. When the spool 311 is in an upshift position (a right position in FIG. 2), the output port 317 is closed, so that the line pressure PL is provided through the input port 313 and the input/output port 314 to the hydraulic actuator 413 for the primary pulley 41. On the other hand, when the spool 311 is in a closed position (a left position in FIG. 2), the input port 313 is closed, so that the hydraulic actuator 413 for the primary pulley 41 is communicated through the input/output port 314 with the output port 317.

A downshift control valve 302 of the hydraulic control circuit 20 is provided with an axially movable spool 321. A spring 322 is disposed in one end portion of the downshift control valve 302 near to one end of the spool 321 (the lower end thereof in FIG. 2). Furthermore, a first hydraulic port 326 is formed in the one end portion of the downshift control valve 302. A second hydraulic port 327 is formed in the other end portion of the downshift control valve 302 opposite to the spring 322 with the spool 321 in between.

The first hydraulic port 326 is connected to the shift control solenoid (DS1) 304. The control hydraulic pressure output from the shift control solenoid (DS1) 304 is applied to the first hydraulic port 326. The second hydraulic port 327 is connected to the shift control solenoid (DS2) 305. The control hydraulic pressure output from the shift control solenoid (DS2) 305 is applied to the second hydraulic port 327.

Furthermore, an input port 323, an input/output port 324, and a discharge port 325 are formed in the downshift control valve 302. The input port 323 is connected to a bypass control valve 306. The hydraulic pressure modulated from the line pressure PL by the bypass control valve 306 is provided to the input port 323. When the spool 321 of the downshift control valve 302 is in a downshift position (a left position in FIG. 2), the input/output port 324 is communicated with the discharge port 325. On the other hand, when the spool 321 is in a closed position (a right position in FIG. 2), the input/output port 324 is closed. The input/output port 324 of the downshift control valve 302 is connected to the output port 317 of the upshift control valve 301.

In the above hydraulic control circuit portion shown in FIG. 2, when the shift control solenoid (DS1) 304 is actuated according to a DS1 shift duty (upshift command) output from the ECU 8 and the control hydraulic pressure output from the shift control solenoid (DS1) 304 is thus provided to the first hydraulic port 315 of the upshift control valve 301, the spool 311 is moved toward the upshift position side (the upper side in FIG. 2) by a thrust depending upon the control hydraulic pressure. By this movement of the spool 311 (toward the upshift position side), working fluid (the line pressure PL) is supplied, in a flow volume corresponding to the control hydraulic pressure, through the input port 313 and the input/output port 314 to the hydraulic actuator 413 for the primary pulley 41 and the output port 317 is closed to interrupt flow of the working fluid to the downshift control valve 302. Thus, the shift control pressure is increased, so that the width of the V-groove of the primary pulley 41 is reduced to reduce the gear ratio γ (upshift).

When the control hydraulic pressure output from the shift control solenoid (DS 1) 304 is provided to the first hydraulic port 326 of the downshift control valve 302, the spool 321 is moved toward the upper side in FIG. 2 to close the input/output port 324.

On the other hand, when the shift control solenoid (DS2) 305 is actuated according to a DS2 shift duty (downshift command) output from the ECU 8 and the control hydraulic pressure output from the shift control solenoid (DS2) 305 is thus provided to the second hydraulic port 316 of the upshift control valve 301, the spool 311 is moved toward the downshift position side (the lower side in FIG. 2) by a thrust depending upon the control hydraulic pressure. By this movement of the spool 311 (toward the downshift position side), the working fluid in the hydraulic actuator 413 for the primary pulley 41 flows, in a flow volume corresponding to the control hydraulic pressure, into the input/output port 314 of the upshift control valve 301. The working fluid having flowed into the upshift control valve 301 passes through the output port 317 and the input/output port 324 of the downshift control valve 302 and is then discharged through the discharge port 325. Thus, the shift control pressure is reduced, so that the width of the V-groove of the primary pulley 41 is increased to increase the gear ratio γ (downshift).

When the control hydraulic pressure output from the shift control solenoid (DS2) 305 is provided to the second hydraulic port 327 of the downshift control valve 302, the spool 321 is moved toward the lower side in FIG. 2 to communicate the input/output port 324 with the discharge port 325.

As seen from the above, when the control hydraulic pressure is output from the shift control solenoid (DS1) 304, the working fluid is supplied via the upshift control valve 301 to the hydraulic actuator 413 for the primary pulley 41 to continuously change the shift control pressure and upshift the CVT 4. On the other hand, when the control hydraulic pressure is output from the shift control solenoid (DS2) 305, the working fluid in the hydraulic actuator 413 for the primary pulley 41 is discharged through the discharge port 325 of the downshift control valve 302 to continuously change the shift control pressure and downshift the CVT 4.

Figure 4:
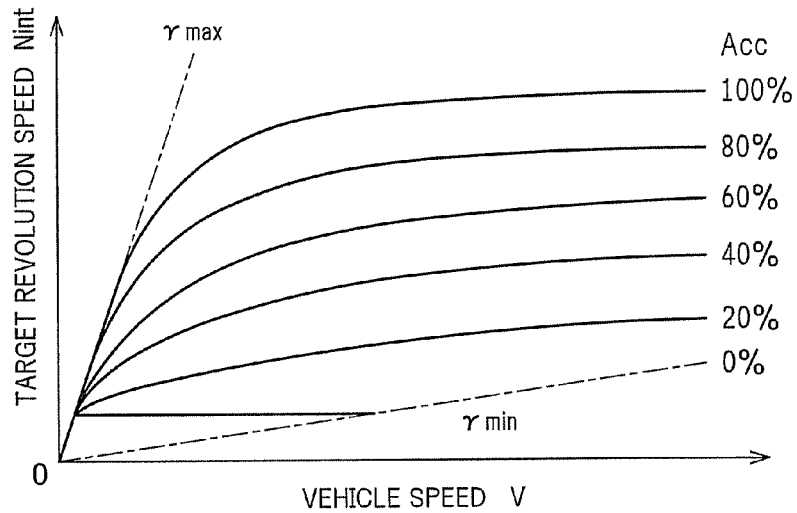
FIG. 4 is a graph showing an example of a map for use in shift control of the belt CVT.

Furthermore, in this embodiment, as shown for example in FIG. 4, a target input revolution speed Nint is calculated from a shift map previously set with the amount Acc of accelerator pedal actuation representing the amount of power output required by the driver and the vehicle speed V as parameters and the shift control of the belt CVT 4 is performed according to the deviation (Nint−Nin) of the actual input shaft revolution speed Nin from the target input revolution speed Nint, i.e., so that the actual input shaft revolution speed Nin agrees with the target input revolution speed Nint. Specifically, the shift control pressure is controlled by supplying or discharging the working fluid to or from the hydraulic actuator 413 for the primary pulley 41, so that the gear ratio γ continuously changes. The map shown in FIG. 4 corresponds to shift conditions of the vehicle and is stored in a ROM 82 (see FIG. 6) of the ECU 8.

In the map of FIG. 4, the target input revolution speed Nint is set so that a lower vehicle speed V and a larger amount Acc of accelerator pedal actuation give a larger gear ratio γ. Furthermore, the vehicle speed V is associated with the secondary pulley revolution speed (output shaft revolution speed) Nout. Therefore, the target input revolution speed Nint as the target value of the primary pulley revolution speed (input shaft revolution speed) Nin is associated with the target gear ratio and is set within the range from the minimum gear ratio γmin to the maximum gear ratio γmax of the belt CVT 4.

<Circuit Configuration for Control of Belt Clamping Force>

Next, a description will be given of the hydraulic control circuit portion for the hydraulic actuator 423 for the secondary pulley 42 with reference to FIG. 3.

As shown in FIG. 3, the hydraulic actuator 423 for the secondary pulley 42 is connected to the belt clamping force control valve 303.

The belt clamping force control valve 303 is provided with an axially movable spool 331. A spring 332 is disposed in one end portion of the belt clamping force control valve 303 near to one end of the spool 331 (the lower end thereof in FIG. 3). Furthermore, a first hydraulic port 335 is formed in the one end portion of the belt clamping force control valve 303. A second hydraulic port 336 is formed in the other end portion of the belt clamping force control valve 303 opposite to the spring 332 with the spool 331 in between.

The first hydraulic port 335 is connected to the linear solenoid (SLS) 202. The control hydraulic pressure output from the linear solenoid (SLS) 202 is applied to the first hydraulic port 335. The hydraulic pressure from the modulator valve 206 is applied to the second hydraulic port 336.

Furthermore, the belt clamping force control valve 303 has an input port 333 through which the line pressure PL is provided, and an output port 334 connected to (communicated with) the hydraulic actuator 423 for the secondary pulley 42.

In the hydraulic control circuit portion shown in FIG. 3, when the control hydraulic pressure output from the linear solenoid (SLS) 202 is increased in a state that a predetermined hydraulic pressure is given to the hydraulic actuator 423 for the secondary pulley 42, the spool 331 of the belt clamping force control valve 303 is moved toward the upper side in FIG. 3. In this case, the hydraulic pressure provided to the hydraulic actuator 423 for the secondary pulley 42 is increased to increase the belt clamping force.

On the other hand, when the control hydraulic pressure output from the linear solenoid (SLS) 202 is reduced in the state that the predetermined hydraulic pressure is given to the hydraulic actuator 423 for the secondary pulley 42, the spool 331 of the belt clamping force control valve 303 is moved toward the lower side in FIG. 3. In this case, the hydraulic pressure provided to the hydraulic actuator 423 for the secondary pulley 42 is reduced to reduce the belt clamping force.

In this manner, the control hydraulic pressure output from the linear solenoid (SLS) 202 acts as a pilot pressure to adjust the line pressure PL and the adjusted hydraulic pressure is provided to the hydraulic actuator 423 for the secondary pulley 42 to increase or reduce the belt clamping force.

Figure 5:
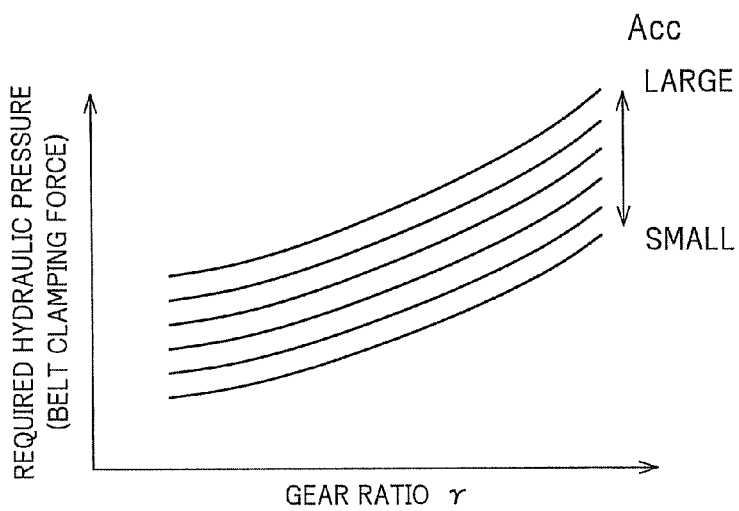
FIG. 5 is a graph showing an example of a map for use in control of belt clamping force of the belt CVT.

Furthermore, in this embodiment, as shown for example in FIG. 5, the control hydraulic pressure to be output from the linear solenoid (SLS) 202 is controlled according to a map of required hydraulic pressure (corresponding to the belt clamping force) previously set, with the amount Acc of accelerator pedal actuation corresponding to the transmission torque and the gear ratio γ (γ=Nin/Nout) as parameters, to avoid the occurrence of belt slip. Thus, the belt clamping force of the belt CVT 4, i.e., the hydraulic pressure of the hydraulic actuator 423 for the secondary pulley 42, is adjusted and controlled. The map shown in FIG. 5 corresponds to clamping force control conditions and is stored in the ROM 82 (see FIG. 6) of the ECU 8.

The map shown in FIG. 5 is used for determining the belt clamping force during normal travel (during travel other than sudden braking) of the vehicle. The belt clamping force required during sudden braking of the vehicle will be described later.

—ECU—

Figure 6:
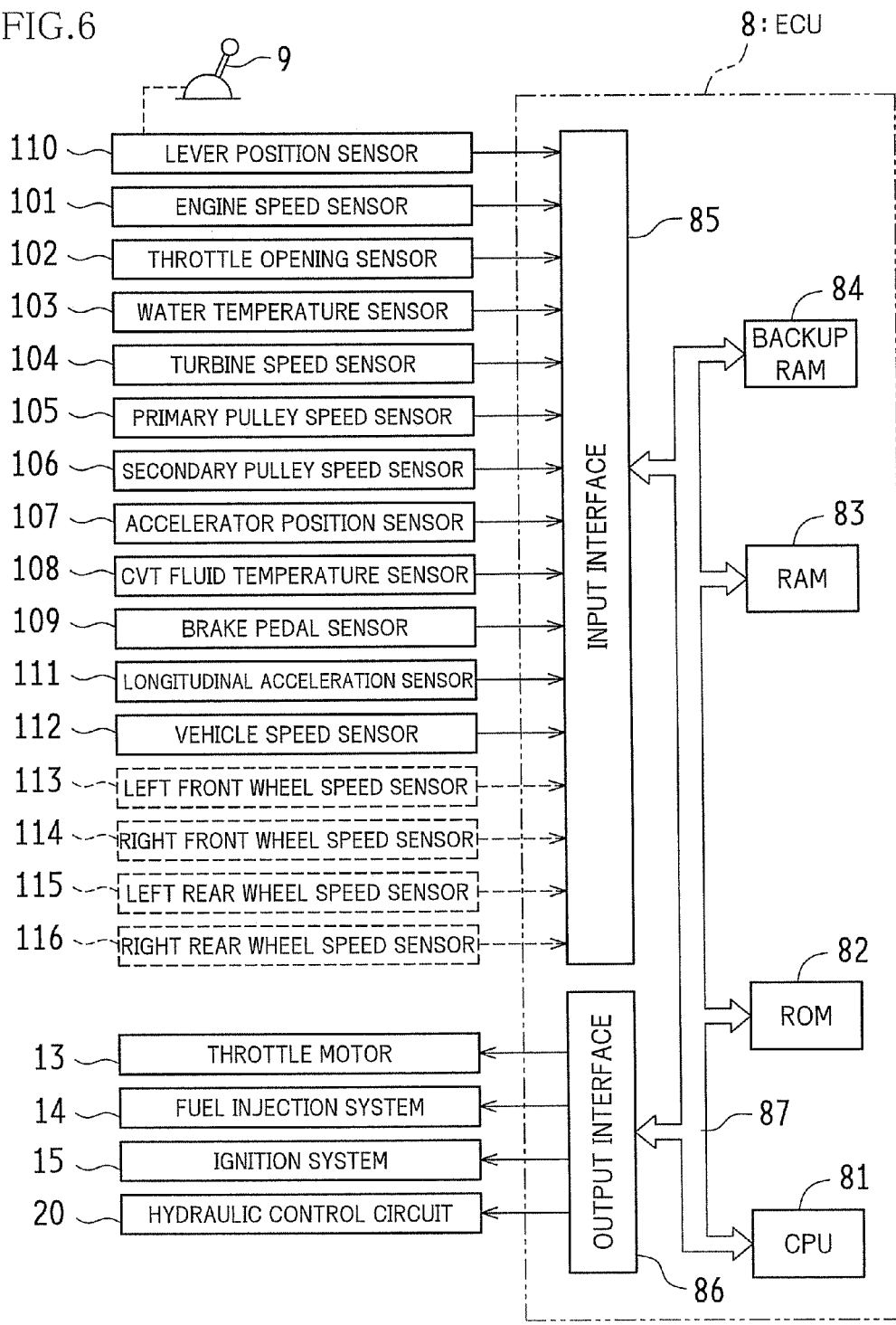
FIG. 6 is a block diagram showing the architecture of a control system including an ECU.

The ECU 8, as shown in FIG. 6, includes a CPU 81, the ROM 82, a RAM 83, a backup RAM 84, and so on.

The ROM 82 stores various control programs and maps that will be referred to in running the control programs. The CPU 81 performs processings based on the various control programs and maps stored in the ROM 82. The RAM 83 is a memory capable of temporarily storing calculation results in the CPU 81 and data input from sensors. The backup RAM 84 is a non-volatile memory capable of storing data to be saved upon shutdown of the engine 1.

The CPU 81, the ROM 82, the RAM 83, and the backup RAM 84 are connected via a bus 87 to each other as well as to an input interface 85 and an output interface 86.

The input interface 85 of the ECU 8 is connected to the engine speed sensor 101, the throttle position sensor 102, the water temperature sensor 103, a turbine speed sensor 104, a primary pulley speed sensor 105, a secondary pulley speed sensor 106, an accelerator position sensor 107, a CVT fluid temperature sensor 108, a brake pedal sensor 109, a lever position sensor 110, a longitudinal acceleration sensor 111, a vehicle speed sensor 112, and so on. The lever position sensor 110 detects the lever position (operation position) of a shift lever 9. The longitudinal acceleration sensor 111 detects the acceleration of the vehicle in the longitudinal direction. The vehicle speed sensor 112 detects the vehicle speed. The output signals of these sensors are sent to the ECU 8. The output signals include signals indicating the revolution speed Ne of the engine 1 (engine speed), the throttle opening θth of the throttle valve 12, the temperature Tw of cooling water in the engine 1, the revolution speed Nt of the turbine shaft 27 (turbine speed), the primary pulley revolution speed (input shaft revolution speed) Nin, the secondary pulley revolution speed (output shaft revolution speed) Nout, the amount Acc of actuation of the accelerator pedal (accelerator opening), the fluid temperature The in the hydraulic control circuit 20 (CVT fluid temperature), whether or not a foot brake as a service brake has been actuated (brake ON/OFF), the lever position (operation position) of the shift lever 9, the acceleration of the vehicle in the longitudinal direction, and the vehicle speed.

If the vehicle is equipped with an ABS (anti-lock brake system), it includes, in addition to the above sensors, a left front wheel speed sensor 113, a right front wheel speed sensor 114, a left rear wheel speed sensor 115, and a right rear wheel speed sensor 116 all of which are shown by the broken lines in FIG. 6 and serve to detect the respective revolution speeds of the associated wheels (wheel speeds). Thus, data about the respective revolution speeds of the wheels is provided to the ECU 8.

The output interface 86 is connected to the throttle motor 13, a fuel injection system 14, an ignition system 15, the hydraulic control circuit 20, and so on.

Among the various types of signals to be sent to the ECU 8, the turbine speed Nt agrees with the primary pulley revolution speed (input shaft revolution speed) Nin at the forward travel in which the forward clutch C1 of the forward/reverse switching mechanism 3 is engaged. Furthermore, the secondary pulley revolution speed (output shaft revolution speed) Nout is associated with the vehicle speed V. Moreover, the amount Acc of accelerator pedal actuation represents the amount of power output required by the driver.

The shift lever 9 can be selectively operated into several positions, including a parking position "P" for parking, a reverse position "R" for reverse travel, a neutral position "N" for interrupting power transmission, a drive position "D" for forward travel, and a manual position "M" where the gear ratio γ of the belt CVT 4 can be manually increased and reduced during forward travel.

The manual position "M" is provided with downshift and upshift positions for increasing and reducing the gear ratio γ or provided with a plurality of range positions in which the driver can select any one of different shift ranges having different highest speeds (smallest gear ratios γ).

The ECU 8 performs, based on the output signals from the aforementioned various types of sensors, the output control of the engine 1, the aforementioned shift control (gear ratio control) and belt clamping force control of the belt CVT 4, the engagement/release control of the lock-up clutch 24, and so on. The output control of the engine 1 is effected by the throttle motor 13, the fuel injection system 14, the ignition system 15, the ECU 8, and so on.

—Control of Belt Clamping Force—

Next, a description will be given of the control of belt clamping force which is an operation characterizing this embodiment. The control of belt clamping force is a control for changing the shift speed (the rate of change of the gear ratio) of the belt CVT 4 depending upon the wheel slip ratio calculated from the wheel speed and the vehicle speed during sudden braking of the vehicle. Specifically, this control of belt clamping force is executed to increase the belt clamping force so that the shift speed of the belt CVT 4 in a downshifted direction becomes higher, the higher is the wheel slip ratio.

The following description is a summary of the control of belt clamping force during sudden braking of the vehicle.

In a conventional measure for, during sudden braking of the vehicle, ensuring the re-accelerability or startability later on, the hydraulic pressure of the hydraulic actuator for the primary pulley is controlled to increase the gear ratio (change it toward γmax). At the same time, in relation to the control of belt clamping force, the hydraulic pressure of the hydraulic actuator for the secondary pulley is controlled to increase the belt clamping force. In this case, the hydraulic pressure to be supplied to the hydraulic actuator for the secondary pulley is set a fixed amount higher than before, which increases the shift speed of a gear shift toward γmax.

However, if during sudden braking the hydraulic pressure to be supplied to the hydraulic actuator for the secondary pulley is simply set a fixed amount higher than before, this simple measure has no way to optimize the hydraulic pressure. The reason for this is that the optimum value of the belt clamping force varies depending upon the condition of a road surface on which the vehicle is traveling. Therefore, the above conventional control of belt clamping force does not have the capability to optimize the belt clamping force according to the road surface condition. Specifically, if the above belt clamping force (set a fixed amount higher than before) is short of the optimum value, sufficient belt returnability may not be able to be obtained. On the other hand, if the hydraulic pressure is higher than the optimum value, the power of an oil pump for providing the hydraulic pressure is increased more than necessary, which will reduce the energy efficiency.

Figure 10:
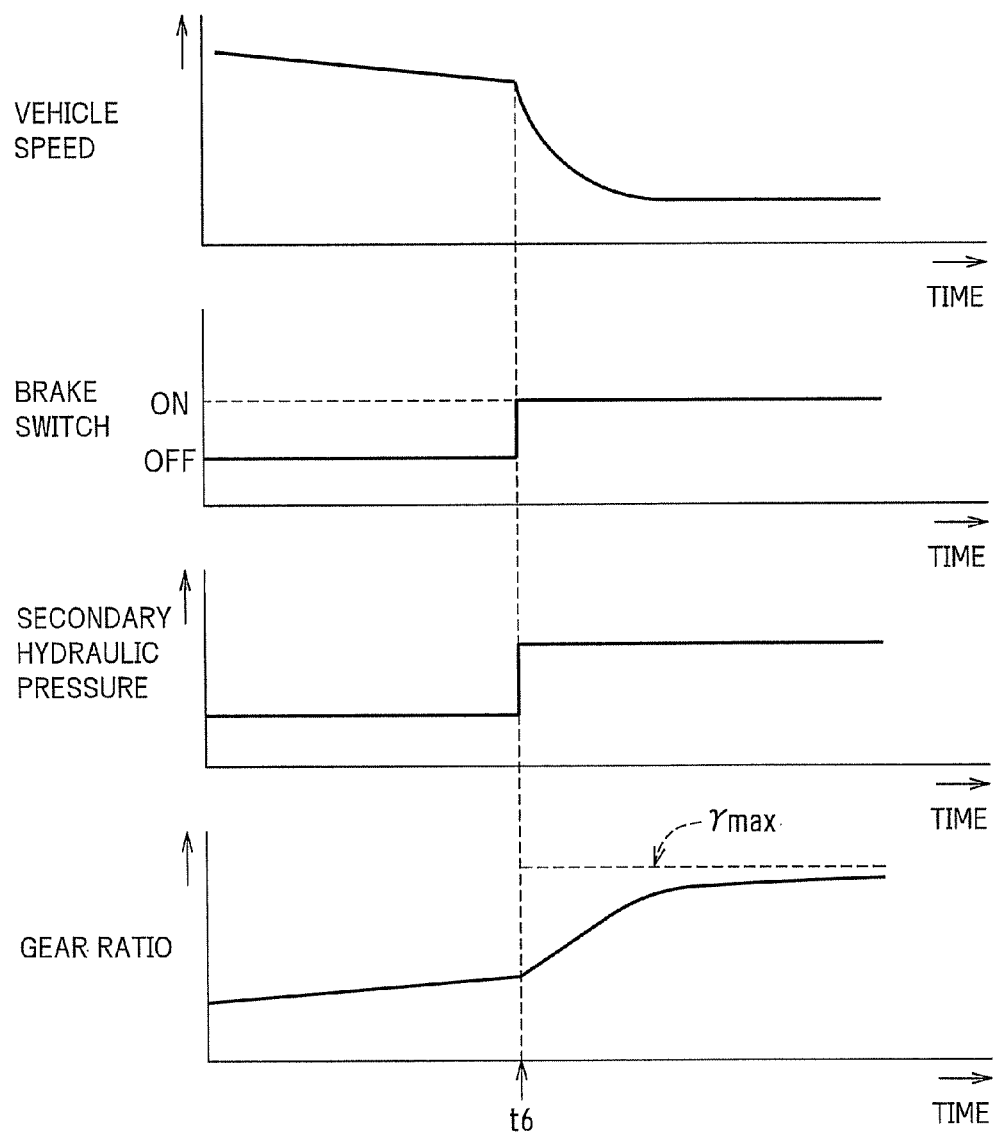
FIG. 10 is a timing chart showing respective examples of changes in vehicle speed, changes in brake switch signal, changes in secondary hydraulic pressure, and changes in gear ratio while a conventional CVT-equipped vehicle is suddenly braked.

FIG. 10 is a timing chart showing respective examples of changes in vehicle speed, changes in brake switch signal, changes in secondary hydraulic pressure, and changes in gear ratio while a conventional CVT-equipped vehicle is suddenly braked. FIG. 10 shows the case where the vehicle speed is reduced to approximately zero by sudden braking of the vehicle and the target value of the gear ratio γ of the belt CVT is the maximum value (γmax).

In the example of the timing chart shown in FIG. 10, a driver's depression of the brake pedal is initiated at the timing t6 and concurrently the secondary hydraulic pressure (belt clamping force) is set a fixed amount higher than before. Furthermore, FIG. 10 reveals that because the fixedly increased amount of secondary hydraulic pressure is insufficient, the rate of change of the gear ratio γ of the belt CVT is too slow to reach the maximum gear ratio (γmax). This means that the belt returnability cannot sufficiently be obtained, so that the re-accelerability and startability later on cannot sufficiently be achieved.

With this problem in mind, in this embodiment, during sudden braking of the vehicle, the wheel slip ratio is calculated from the wheel speed and the vehicle speed and, in order to achieve the shift speed depending upon the slip ratio, the belt clamping force is controlled to become higher, the higher is the wheel slip ratio.

Figure 7:
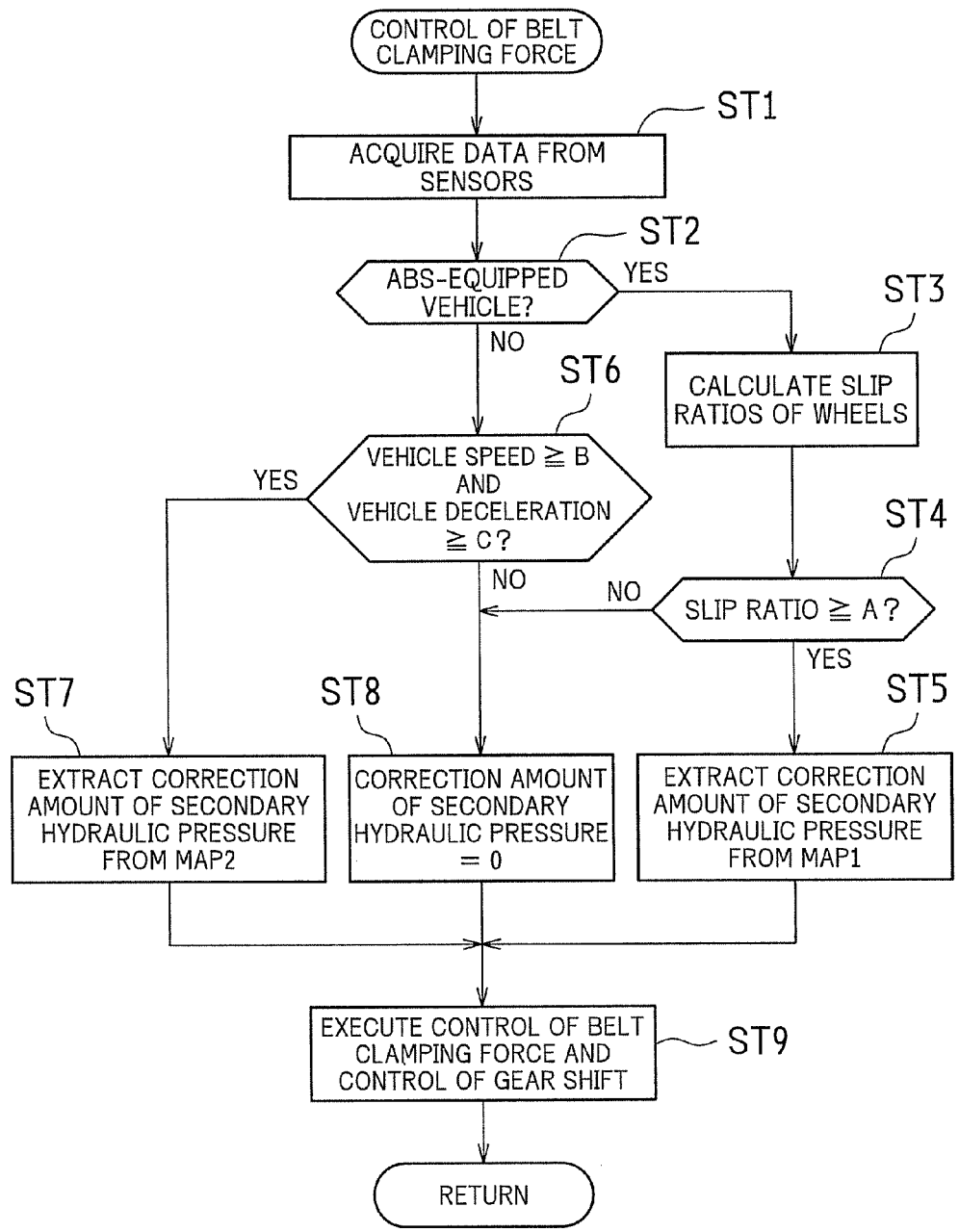
FIG. 7 is a flowchart showing the procedure of the control of belt clamping force.

The details of the control of belt clamping force in this embodiment will be described below with reference to the flowchart of FIG. 7. This flowchart shown in FIG. 7 is run every several milliseconds while the vehicle is traveling.

First, in step ST1, data from the sensors is acquired. Specifically, the acquired data includes data about the respective wheel speeds from the four wheel speed sensors 113 to 116, data about the vehicle speed (relative speed of the vehicle body to the road surface) from the vehicle speed sensor 112, data about the acceleration of the vehicle in the longitudinal direction (if during braking, data about the deceleration of the vehicle) from the longitudinal acceleration sensor 111, data about the revolution speed Nin of the primary pulley (the revolution speed of the input shaft) from the primary pulley speed sensor 105, and data about the revolution speed Nout of the secondary pulley (the revolution speed of the output shaft) from the secondary pulley speed sensor 106.

Thereafter, the process proceeds to step ST2 to determine whether or not the vehicle is an ABS-equipped vehicle. This determination may be made by reading data (data about whether to be an ABS-equipped vehicle or non-ABS-equipped vehicle) previously written in the ROM 82 or determining whether or not data about the wheel speeds from the wheel speed sensors 113 to 116 could be acquired. Specifically, if data about the wheel speeds from the wheel speed sensors 113 to 116 could be acquired, the vehicle is determined to be an ABS-equipped vehicle. If such data could not be acquired, the vehicle is determined to be a non-ABS-equipped vehicle.

If the vehicle is an ABS-equipped vehicle and thus the determination in step ST2 is YES, the process proceeds to step ST3 to calculate the individual slip ratios SLP of the wheels. The slip ratio SLP is calculated for each wheel from the following equation (1).

$$SLP(\%)=\{1-(\text{wheel speed})/(\text{vehicle speed})\} \times 100 \quad (1)$$

where "wheel speed" is a revolution speed of each wheel detected by the associated one of the wheel speed sensors 113 to 116 as described previously (a value obtained by multiplying the angular speed of the wheel by the wheel diameter) and "vehicle speed" is a vehicle speed detected by the vehicle speed sensor 112.

After the respective slip ratios SLP of the wheels are calculated in the above manner, the process proceeds to step ST4 to determine whether or not at least one of the slip ratios SLP of the wheels is equal to or larger than a predetermined value A (whether or not there is any wheel having a slip ratio SLP of the predetermined value A or more). The predetermined value A is set at, for example, 40%. The predetermined value A is not limited to this value and can be appropriately set through experiments and/or simulations.

Thereafter, the process proceeds to step ST5 to extract, from MAP1 stored in the ROM 82, a correction amount of hydraulic pressure of the hydraulic actuator 423 for the secondary pulley 42 (secondary hydraulic pressure). MAP1 is a map of secondary hydraulic pressure created with the wheel slip ratio, the vehicle speed, and the gear ratio γ of the belt CVT 4 as parameters and is used to extract the correction amount of secondary hydraulic pressure. In relation to these parameters, the wheel slip ratio for use as the parameter is the maximum of the slip ratios of the wheels calculated in step ST3. If there are a plurality wheels having a slip ratio SLP of the predetermined value A or more, the average value of the slip ratios SLP of these wheels may be used as the parameter. The vehicle speed is a value detected by the vehicle speed sensor 112. The gear ratio γ of the belt CVT 4 is calculated from the revolution speed Nin of the primary pulley detected by the primary pulley speed sensor 105 and the revolution speed Nout of the secondary pulley detected by the secondary pulley speed sensor 106 (Nin/Nout). Alternatively, data about the gear ratio γ of the belt CVT 4 may be acquired by reading a gear ratio command signal output from the output interface 86 of the ECU 8 to the hydraulic control circuit 20.

MAP1 is previously created through experiments and/or simulations and stored in the ROM 82. In this MAP1, the correction amount of secondary hydraulic pressure becomes larger, the higher is the slip ratio, the higher is the vehicle speed, and/or the smaller is the gear ratio γ of the belt CVT 4 (the nearer the current gear ratio γ is to the upshift end). For example, the correction amount of secondary hydraulic pressure is obtained, depending upon the slip ratio and other parameters, as a value in the range of 5% to 30% of the value of the belt clamping force obtained from the aforementioned map of required hydraulic pressure (FIG. 5). The range of the correction amount is not limited to this and can be appropriately defined. Alternatively, the correction amount of secondary hydraulic pressure may be calculated from a previously created arithmetic expression.

After the correction amount of secondary hydraulic pressure is obtained in the above manner, the process proceeds to step ST9 to execute the control of belt clamping force and the control of gear ratio. In the control of belt clamping force, the correction amount of secondary hydraulic pressure obtained in step ST5 is added to the belt clamping force obtained from the map of required hydraulic pressure (map of belt clamping force) shown in FIG. 5, i.e., the belt clamping force obtained with the amount Acc of accelerator pedal actuation and the gear ratio γ as parameters, to calculate a final belt clamping force. Then, the control of belt clamping force is executed to achieve this final belt clamping force.

Specifically, as described previously, the control hydraulic pressure output from the linear solenoid (SLS) 202 acts as a pilot pressure to adjust the line pressure PL and the adjusted hydraulic pressure is provided to the hydraulic actuator 423 for the secondary pulley 42 to increase or reduce the belt clamping force. In doing so, the line pressure PL is adjusted to give the final belt clamping force.

In the control of gear ratio executed concurrently with the control of belt clamping force, the shift control solenoid (DS2) 305 is actuated according to a DS2 shift duty (downshift command) output from the ECU 8 as described previously to reduce the hydraulic pressure of the hydraulic actuator 413 for the primary pulley 41. Specifically, the hydraulic pressure of the hydraulic actuator 413 is reduced by discharging the working fluid through the discharge port 325 of the downshift control valve 302. Thus, the width of the V-groove of the primary pulley 41 is increased to increase the gear ratio γ.

At this time, the final belt clamping force, which is set as the belt clamping force for the secondary pulley 42 as described previously, is set at a large value increased depending upon the wheel slip ratio. Thus, the width of the V-groove of the secondary pulley 42 is rapidly reduced. This is accompanied by an increase of the pressure applied from the belt 43 to the movable sheave 412 of the primary pulley 41 to promote the discharge of working fluid from the hydraulic actuator 413 for the primary pulley 41. Thus, the width of the V-groove of the primary pulley 41 is rapidly increased to rapidly increase (downshift) the gear ratio γ of the belt CVT 4.

On the other hand, if the vehicle is a non-ABS-equipped vehicle and thus the determination in step ST2 is NO, the process proceeds to step ST6 to determine whether or not the vehicle speed is equal to or higher than a predetermined value B and the vehicle deceleration is equal to or higher than a predetermined value C.

Here, the vehicle speed is a vehicle speed detected by the vehicle speed sensor 112. The vehicle deceleration is a deceleration of the vehicle body calculated based on the acceleration in the longitudinal direction of the vehicle body detected by the longitudinal acceleration sensor 111. Alternatively, the vehicle deceleration may be calculated as an amount of reduction per unit time of the vehicle speed detected by the vehicle speed sensor 112.

If the vehicle speed is equal to or higher than the predetermined value B and the vehicle deceleration is equal to or higher than the predetermined value C, so that the determination in step ST6 is YES, the process proceeds to step ST7 to extract the correction amount of secondary hydraulic pressure from MAP2 stored in the ROM 82. MAP2 is a map of secondary hydraulic pressure created with the vehicle speed, the vehicle deceleration, and the gear ratio γ of the belt CVT 4 as parameters and is used to extract the correction amount of secondary hydraulic pressure. Among these parameters, the vehicle speed is a value detected by the vehicle speed sensor 112. The vehicle deceleration is calculated based on the acceleration in the longitudinal direction of the vehicle body detected by the longitudinal acceleration sensor 111. Alternatively, as described previously, the vehicle deceleration may be calculated as an amount of reduction per unit time of the vehicle speed detected by the vehicle speed sensor 112. The gear ratio γ of the belt CVT 4 is calculated from the revolution speed Nin of the primary pulley detected by the primary pulley speed sensor 105 and the revolution speed Nout of the secondary pulley detected by the secondary pulley speed sensor 106 (Nin/Nout). Alternatively, data about the gear ratio γ of the belt CVT 4 may be acquired by reading a gear ratio command signal output from the output interface 86 of the ECU 8 to the hydraulic control circuit 20.

MAP2 is previously created through experiments and/or simulations and stored in the ROM 82. In this MAP2, the correction amount of secondary hydraulic pressure becomes larger, the higher is the vehicle speed, the higher is the vehicle deceleration, and/or the smaller is the gear ratio γ of the belt CVT 4 (the nearer the current gear ratio γ is to the upshift end). For example, the correction amount of secondary hydraulic pressure is obtained, depending upon the vehicle deceleration and other parameters, as a value in the range of 5% to 30% of the value of the belt clamping force obtained from the aforementioned map of required hydraulic pressure (FIG. 5). The range of the correction amount is not limited to this and can be appropriately defined. Alternatively, the correction amount of secondary hydraulic pressure may be calculated from a previously created arithmetic expression.

After the correction amount of secondary hydraulic pressure is obtained in the above manner, the process proceeds to step ST9 to execute the control of belt clamping force and the control of gear ratio. Also in the control of belt clamping force in this case, in the same manner as in the aforementioned case, the correction amount of secondary hydraulic pressure obtained in step ST7 is added to the belt clamping force obtained from the map of required hydraulic pressure (map of belt clamping force) shown in FIG. 5 to calculate a final belt clamping force and then the control of belt clamping force is executed to achieve this final belt clamping force. Specifically, as described previously, the control hydraulic pressure output from the linear solenoid (SLS) 202 acts as a pilot pressure to adjust the line pressure PL and the adjusted hydraulic pressure is provided to the hydraulic actuator 423 for the secondary pulley 42 to increase or reduce the belt clamping force. In doing so, the line pressure PL is adjusted to give the final belt clamping force. The control of gear ratio (downshift control of gear ratio using the hydraulic pressure control of the hydraulic actuator 413 for the primary pulley 41) is the same as in the aforementioned case and therefore no further explanation thereof will be given here.

At this time, the final belt clamping force, which is set as the belt clamping force for the secondary pulley 42 as described previously, is set at a large value increased depending upon the vehicle deceleration and other parameters. Thus, the width of the V-groove of the secondary pulley 42 is rapidly reduced, followed by a rapid increase of the width of the V-groove of the primary pulley 41. As a result, the gear ratio γ of the belt CVT 4 is rapidly increased (downshifted).

If the determination in step ST6 is NO (the vehicle speed is lower than the predetermined value B and/or the vehicle deceleration is lower than the predetermined value C), the process proceeds to step ST8. In step ST8, the correction amount of secondary hydraulic pressure is set at zero. In other words, the secondary hydraulic pressure is not corrected.

In this case, the control of belt clamping force in step ST9 is executed to achieve a belt clamping force obtained from the map of required hydraulic pressure (map of belt clamping force) shown in FIG. 5. Specifically, as described previously, the control hydraulic pressure output from the linear solenoid (SLS) 202 acts as a pilot pressure to adjust the line pressure PL and the adjusted hydraulic pressure is provided to the hydraulic actuator 423 for the secondary pulley 42 to increase or reduce the belt clamping force. In doing so, the line pressure PL is adjusted to give the above belt clamping force (the belt clamping force obtained from the map of required hydraulic pressure). The control of gear ratio (downshift control of gear ratio using the hydraulic pressure control of the hydraulic actuator 413 for the primary pulley 41) is the same as in the aforementioned case and therefore no further explanation thereof will be given here.

Figure 8:
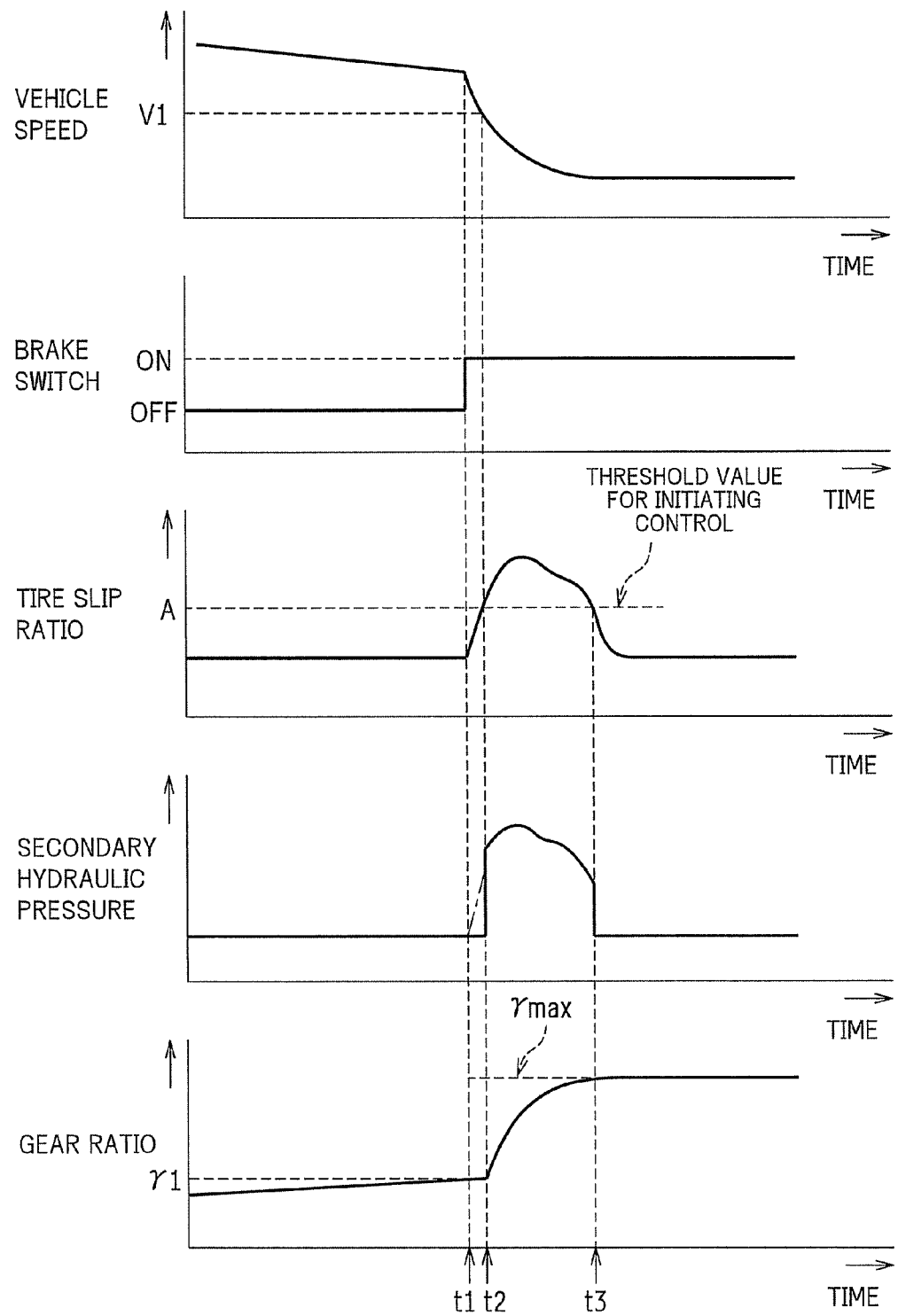
FIG. 8 is a timing chart showing respective examples of changes in vehicle speed, changes in brake switch signal, changes in tire slip ratio, changes in secondary hydraulic pressure, and changes in gear ratio while an ABS-equipped vehicle is suddenly braked.

FIG. 8 is a timing chart showing respective examples of changes in vehicle speed, changes in brake switch signal, changes in tire slip ratio, changes in secondary hydraulic pressure, and changes in gear ratio while an ABS-equipped vehicle is suddenly braked. Specifically, this figure shows a control during sudden braking of the vehicle executed through the operations from step ST2 through steps ST3, ST4, and ST5 to step ST9 in the above flowchart. Furthermore, FIG. 8 shows the case where the vehicle speed is reduced to approximately zero by sudden braking of the vehicle and the target value of the gear ratio γ of the belt CVT 4 is the maximum value (γmax).

In the example of the timing chart shown in FIG. 8, a driver's depression of the brake pedal is initiated at the timing t1 and then the tire slip ratio has reached the predetermined value A at the timing t2. In this case, at the timing t2, the correction amount of secondary hydraulic pressure is obtained from the aforementioned MAP1. Specifically, at the timing t2 the slip ratio A, the vehicle speed V1, and the gear ratio γ1 of the belt CVT 4 in the figure are applied to MAP1 to find a correction amount of secondary hydraulic pressure. Thereafter, with changes in slip ratio, vehicle speed, and gear ratio of the belt CVT 4, the correction amount of secondary hydraulic pressure obtained from MAP1 is updated. This is accompanied by updating of the secondary hydraulic pressure (final belt clamping force). In the example shown in FIG. 8, while the slip ratio is increasing, the secondary hydraulic pressure is also increasing. Furthermore, while the slip ratio is dropping, the secondary hydraulic pressure is gradually reducing with reduction in vehicle speed and increase in gear ratio of the belt CVT 4.

While the secondary hydraulic pressure is corrected in the above manner, the gear ratio γ of the belt CVT 4 is rapidly changed to the maximum gear ratio γmax (see the period from the timing t2 to the timing t3 during which the slip ratio is equal to or higher than A in FIG. 8). Thus, good re-accelerability and vehicle startability later on can be achieved.

Figure 9:
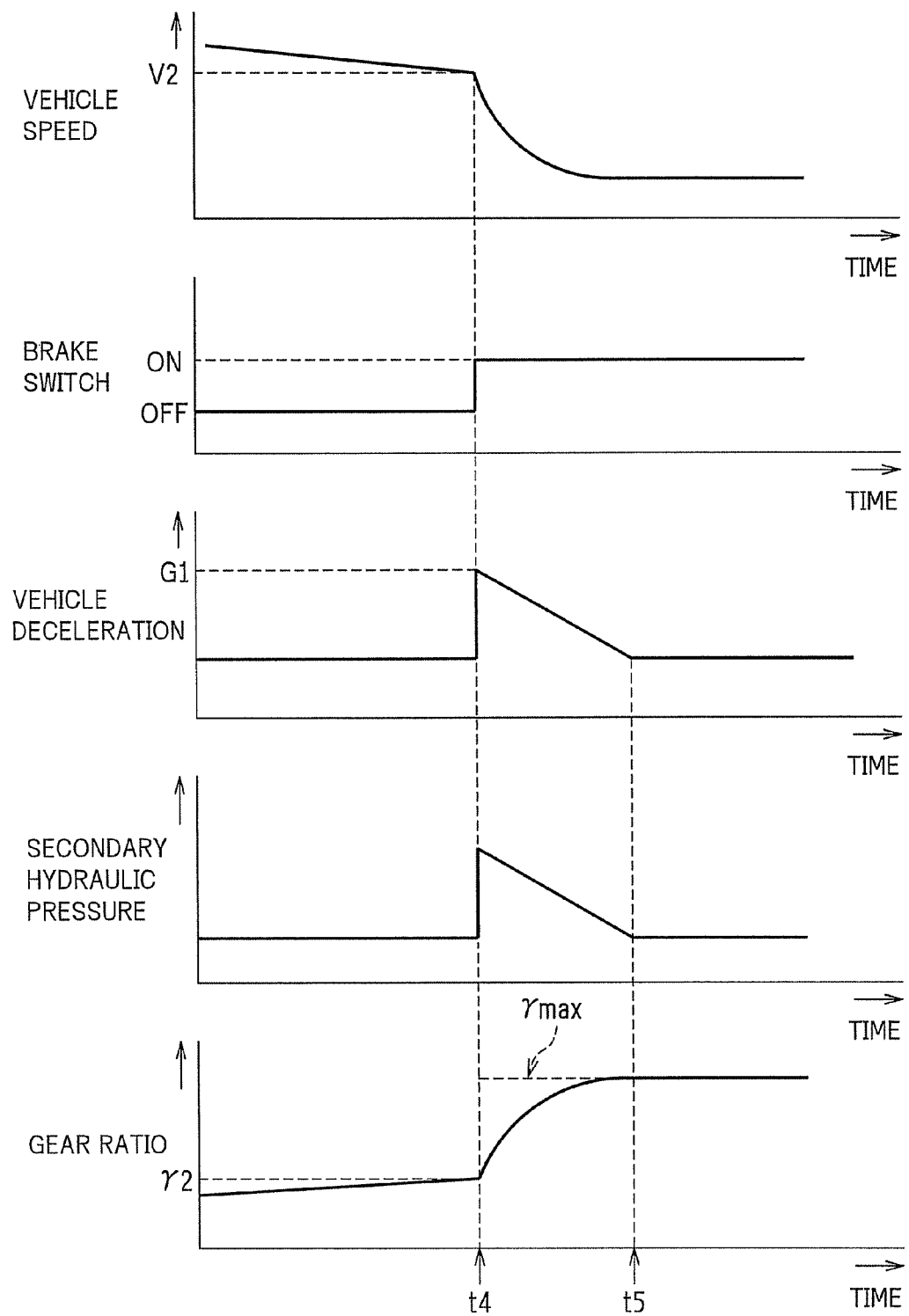
FIG. 9 is a timing chart showing respective examples of changes in vehicle speed, changes in brake switch signal, changes in deceleration, changes in secondary hydraulic pressure, and changes in gear ratio while a non-ABS-equipped vehicle is suddenly braked.

FIG. 9 is a timing chart showing respective examples of changes in vehicle speed, changes in brake switch signal, changes in deceleration, changes in secondary hydraulic pressure, and changes in gear ratio while a non-ABS-equipped vehicle is suddenly braked. Specifically, this figure shows a control during sudden braking of the vehicle executed through the operations from step ST2 through steps ST6 and ST7 to step ST9 in the above flowchart. Furthermore, FIG. 9 also shows the case where the vehicle speed is reduced to approximately zero by sudden braking of the vehicle and the target value of the gear ratio γ of the belt CVT 4 is the maximum value (γmax).

In the example of the timing chart shown in FIG. 9, at the timing t4, a driver's depression of the brake pedal is initiated and the correction amount of secondary hydraulic pressure is obtained from the aforementioned MAP2. Specifically, at the timing t4 the vehicle deceleration G1, the vehicle speed V2, and the gear ratio γ 2 of the belt CVT 4 in the figure are applied to MAP2 to find a correction amount of secondary hydraulic pressure. Thereafter, with changes in vehicle deceleration, vehicle speed, and gear ratio of the belt CVT 4, the correction amount of secondary hydraulic pressure obtained from MAP2 is updated. This is accompanied by updating of the secondary hydraulic pressure (final belt clamping force). In the example shown in FIG. 9, the secondary hydraulic pressure is gradually reducing with reduction in vehicle deceleration, reduction in vehicle speed, and increase in gear ratio of the belt CVT 4.

While the secondary hydraulic pressure is corrected in the above manner, the gear ratio γ of the belt CVT 4 is rapidly changed to the maximum gear ratio (γmax). Thus, good re-accelerability and vehicle startability later on can be achieved.

As thus far described, in this embodiment, under a situation where the wheel slip ratio is high, the hydraulic pressure to be supplied to the hydraulic actuator 423 for the secondary pulley 42 is incrementally corrected to increase the shift speed of the belt CVT 4 in the downshifted direction. Therefore, the belt clamping force can be optimized according to the road surface condition, so that while the belt returnability can sufficiently be ensured, the power of the oil pump 7 can be reduced to the necessary minimum to improve the fuel economy.

Furthermore, the wheel slip ratio is a value reflecting the road surface condition, the state of sudden braking (the magnitude of a braking force), and the locked state of the wheel. Therefore, the shift speed in the downshift direction depending upon these factors can be obtained, which enables early achievement to a gear ratio capable of ensuring good re-accelerability and startability of the vehicle.

—Other Embodiments—

While a single preferred embodiment of the present invention has thus far been described in detail with reference to the drawings, the embodiment is merely illustrative. The present invention can be implemented in any of a variety of forms in which modifications and improvements are made based on knowledge of those skilled in the art.

In the above embodiment, during sudden braking of an ABS-equipped vehicle, the secondary hydraulic pressure is incrementally corrected at the point of time when the wheel slip ratio first reaches or exceeds the predetermined value A. However, the present invention is not limited to this. For example, before the wheel slip ratio first reaches or exceeds the predetermined value A and at the point of time when the deceleration of the vehicle reaches a predetermined value so that the vehicle can be determined to have been suddenly braked, the secondary hydraulic pressure is previously incrementally corrected by a predetermined amount.

Specifically, as shown by the dash-single-dot line in "SECONDARY HYDRAULIC PRESSURE" of the timing chart of FIG. 8, if a driver's depression of the brake pedal is initiated at the timing t1 and at this time the vehicle deceleration reaches the predetermined value, an incremental correction of the secondary hydraulic pressure is initiated at the timing t1. Then, if the wheel slip ratio reaches or exceeds the predetermined value A, the secondary hydraulic pressure is incrementally corrected according to MAP 1.

Thus, even during sudden braking in which the wheel slip ratio may not reach the predetermined value A or even in a sudden braking period in which the wheel slip ratio has not reach the predetermined value A, the secondary hydraulic pressure is incrementally corrected. As a result, the gear ratio appropriate to the road surface condition can be early ensured.

Furthermore, in the above embodiment, a description has been given of the case where the present invention is applied to a vehicle equipped with a belt CVT 4 as the CVT. However, the present invention is not limited to this case and is also applicable to vehicles equipped with other types of CVTs, such as a toroidal CVT or a chain CVT.

In the above embodiment, while in an ABS-equipped vehicle the correction amount of secondary hydraulic pressure is obtained based on the wheel slip ratio and other parameters, the correction amount of secondary hydraulic pressure in a non-ABS-equipped vehicle is obtained based on the vehicle deceleration and other parameters. However, the present invention is not limited to this. If the vehicle is equipped with the wheel speed sensors 113 to 116 regardless of whether it has the ABS function, the correction amount of secondary hydraulic pressure may be obtained based on the wheel slip ratio and other parameters. On the other hand, if the vehicle is not equipped with the wheel speed sensors 113 to 116, the correction amount of secondary hydraulic pressure may be obtained based on the vehicle deceleration and other parameters.

If, in the vehicle equipped with the wheel speed sensors 113 to 116, data about wheel speed cannot be acquired because of sensor failure or the like, the manner of obtaining the correction amount of secondary hydraulic pressure can be changed from the manner based on the wheel slip ratio and other parameters to the manner based on the vehicle deceleration and other parameters.

Furthermore, in the above embodiment, when the wheel slip ratio reaches or exceeds the predetermined value (threshold value) A, the correction amount of secondary hydraulic pressure is obtained based on the slip ratio and other parameters. However, the present invention is not limited to this. The correction amount of secondary hydraulic pressure may be always obtained, without setting of the above threshold value, based on the wheel slip ratio and other parameters. This alternative is also within the scope of the technical idea of the present invention.

Although not illustrated by examples, the present invention can be implemented by making various modifications without departing from the spirit of the present invention.

What is claimed is:

1. A shift control apparatus for a continuously variable transmission configured to transmit power from a drive power source of a vehicle toward a drive wheel of the vehicle, the shift control apparatus being configured to change a gear ratio of the continuously variable transmission with changes in vehicle speed and, during sudden braking of the vehicle, change a rate of change of the gear ratio of the continuously variable transmission in a downshift direction depending upon a wheel slip ratio calculated from a wheel speed and the vehicle speed.

2. The shift control apparatus for a continuously variable transmission according to claim 1, wherein the rate of change of the gear ratio of the continuously variable transmission in the downshift direction is set higher, the higher is the wheel slip ratio.

3. The shift control apparatus for a continuously variable transmission according to claim 2, wherein
the rate of change of the gear ratio of the continuously variable transmission in the downshift direction is set higher, the higher is the vehicle speed and/or the smaller is the gear ratio of the continuously variable transmission.

4. The shift control apparatus for a continuously variable transmission according to claim 1, wherein if at least one of a plurality of wheels of the vehicle has a wheel slip ratio of a predetermined threshold value or higher, the rate of change of the gear ratio of the continuously variable transmission in the downshift direction is set higher, the higher is the wheel slip ratio of the at least one wheel.

5. The shift control apparatus for a continuously variable transmission according to claim 4, wherein
the rate of change of the gear ratio of the continuously variable transmission in the downshift direction is set higher, the higher is the vehicle speed and/or the smaller is the gear ratio of the continuously variable transmission.

6. The shift control apparatus for a continuously variable transmission according to claim 1, wherein
the continuously variable transmission is a belt continuously variable transmission which includes: a primary pulley configured to receive the power from the drive power source; a secondary pulley configured to output the power toward the drive wheel; a belt winded around the primary pulley and the secondary pulley; a primary side hydraulic actuator configured to move a sheave of the primary pulley to change a width of a pulley groove thereof; and a secondary side hydraulic actuator configured to move a sheave of the secondary pulley to change a width of a pulley groove thereof and is configured so that when the widths of the pulley grooves are changed, respective winding positions of the belt in radial directions of the primary and secondary pulleys are allowed to be accordingly changed to change the gear ratio, and
the shift control apparatus is configured to set the hydraulic pressure to be supplied to the secondary side hydraulic actuator higher, the higher is the wheel slip ratio, thus increasing a belt clamping force of the secondary pulley.

7. The shift control apparatus for a continuously variable transmission according to claim 1, wherein
the rate of change of the gear ratio of the continuously variable transmission in the downshift direction is set higher, the higher is a deceleration of the vehicle and/or the higher is the vehicle speed.

* * * * *